(12) United States Patent
Yule

(10) Patent No.: US 6,775,615 B2
(45) Date of Patent: Aug. 10, 2004

(54) METHOD OF OBTAINING A POSITION FIX IN A GPS RECEIVER AND A GPS RECEIVER FOR THE SAME

(75) Inventor: Andrew T. Yule, East Grinstead (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/319,872

(22) Filed: Dec. 13, 2002

(65) Prior Publication Data

US 2003/0114982 A1 Jun. 19, 2003

(30) Foreign Application Priority Data

Dec. 19, 2001 (GB) .............................................. 0130250

(51) Int. Cl.[7] .............................................. G01S 13/00
(52) U.S. Cl. ............. 701/213; 342/357.02; 342/357.05; 342/357.06
(58) Field of Search ................................ 701/213, 214, 701/207; 342/357.02, 357.04, 357.06, 357.05, 357.09, 357.12, 357.03, 357.01, 352; 455/12.1, 457, 456, 405; 345/357.02

(56) References Cited

U.S. PATENT DOCUMENTS

| | | | | |
|---|---|---|---|---|
| 5,736,960 A | | 4/1998 | Murphy et al. ............. 342/357 |
| 5,913,170 A | * | 6/1999 | Wortham ..................... 455/457 |
| 6,397,147 B1 | * | 5/2002 | Whitehead ................... 701/213 |
| 6,473,694 B1 | * | 10/2002 | Akopian et al. ............. 701/213 |
| 6,618,671 B2 | * | 9/2003 | Dooley et al. .............. 701/213 |
| 2002/0142783 A1 | * | 10/2002 | Yoldi et al. ................. 455/456 |
| 2003/0014188 A1 | * | 1/2003 | Abraham et al. ........... 701/213 |
| 2003/0090413 A1 | * | 5/2003 | Syrjarinne et al. ..... 342/357.05 |

* cited by examiner

*Primary Examiner*—Thomas G. Black
*Assistant Examiner*—Tuan C To
(74) *Attorney, Agent, or Firm*—Aaron Waxler

(57) ABSTRACT

A method of obtaining a position fix in a GPS receiver is disclosed together with a GPS receiver for the same. The method comprising the steps of (i) providing an estimate of clock offset between the GPS receiver and the GPS satellites; (ii) measuring a set of pseudoranges from the GPS receiver to GPS satellites; and (iii) either (a) resolving the set of pseudoranges obtained in step (ii) to obtain a position fix, or (b) providing an estimate of the position of the GPS receiver, resolving the set of pseudoranges obtained in step (ii) to obtain a position fix correction, and obtaining a position fix using the estimate of the position of the GPS receiver and the position fix correction, wherein resolving the pseudoranges in step (iii)(a) or step (iii)(b) does not involve resolving the pseudoranges for either a new clock offset or clock offset correction.

4 Claims, 1 Drawing Sheet

METHOD OF OBTAINING A POSITION FIX IN A GPS RECEIVER AND A GPS RECEIVER FOR THE SAME

FIELD OF INVENTION

This invention relates to a method of obtaining a position fix in a GPS receiver and a GPS receiver for the same.

BACKGROUND TO INVENTION

The classic GPS position fix algorithm involves solving the following four equations:

$$\sqrt{(x-s_x^1)^2+(y-s_y^1)^2+(z-s_z^1)^2}=\rho_1-ct$$

$$\sqrt{(x-s_x^2)^2+(y-s_y^2)^2+(z-s_z^2)^2}=\rho_2-ct$$

$$\sqrt{(x-s_x^3)^2+(y-s_y^3)^2+(z-s_z^3)^2}=\rho_3-ct$$

$$\sqrt{(x-s_x^4)^2+(y-s_y^4)^2+(z-s_z^4)^2}=\rho_4-ct$$

where $\rho_i$ is the measured pseudorange from a GPS receiver to the $i^{th}$ satellite having a known position vector $s_i=(s_x^i, s_y^i, s_z^i)$, x, y and z are the co-ordinates of the GPS receiver, t is the clock offset of the GPS receiver compared to the GPS time base and c is the speed of light. In the event that pseudoranges can be measured from more than 4 satellites, an overdetermined set of equations may be derived and solved, for example, by using a best fit type, iterative technique. Unfortunately, however, the amount of computation involved in employing such an technique to solve for 4 unknowns, i.e. x, y, z and clock offset, is significant. For example, consider the following conventional method:

Step 1. Calculate the following direction cosines matrix H:

$$H = \begin{pmatrix} \frac{x-s_x^1}{r_1} & \frac{y-s_y^1}{r_1} & \frac{z-s_z^1}{r_1} & 1 \\ \frac{x-s_x^2}{r_2} & \frac{y-s_y^2}{r_2} & \frac{z-s_z^2}{r_2} & 1 \\ \vdots & \vdots & \vdots & \vdots \\ \frac{x-s_x^n}{r_n} & \frac{y-s_y^n}{r_n} & \frac{z-s_z^n}{r_n} & 1 \end{pmatrix}$$

where n is the number of satellites (4 or more) and $R_i$ is the distance from an estimate of the position of the GPS receiver to the $i^{th}$ satellite, calculated in the following manner:

$$r_i = \sqrt{(x-s_x^i)^2+(y-s_y^i)^2+(z-s_z^i)^2}$$

Step 2. Calculate the following pseudorange error vector Q:

$$Q = \begin{pmatrix} \rho_1 - (r_1 + ct) \\ \rho_2 - (r_2 + ct) \\ \vdots \\ \rho_n - (r_n + ct) \end{pmatrix}$$

Step 3. Calculate a correction vector P whereby $P=(H^TH)^{-1}H^TQ$ (or in a simplified form if n=4, $P=H^{-1}Q$).

Step 4. Correct the estimate S of the position of the GPS receiver and clock offset whereby S'=S+P, where:

$$S = \begin{pmatrix} x \\ y \\ z \\ ct \end{pmatrix}$$

and S' is the corrected version. These steps are repeated until the solution has converged to a required degree of accuracy, normally determined when |P| is less than some threshold.

By far the largest contribution to the total computation requirement in steps 1 to 4 above is the 4×4 matrix inversion $(H^TH)^{-1}$ done in step 3.

OBJECT OF INVENTION

It is an object of the present invention to provide a method of obtaining a position fix in a GPS receiver with a reduced computational requirement, and a GPS receiver configured for the same.

SUMMARY OF INVENTION

According to the present invention, such a method and GPS receiver are provided, the method comprising the steps of (i) providing an estimate of clock offset between the GPS receiver and the GPS satellites; (ii) measuring a set of pseudoranges from the GPS receiver to GPS satellites; and (iii) either (a) resolving the set of pseudoranges obtained in step (ii) to obtain a position fix, or (b) providing an estimate of the position of the GPS receiver, resolving the set of pseudoranges obtained in step (ii) to obtain a position fix correction, and obtaining a position fix using the estimate of the position of the GPS receiver and the position fix correction, wherein resolving the pseudoranges in either step (iii)(a) or step (iii)(b) does not involve resolving the pseudoranges for either a new clock offset or clock offset correction.

There is an underlying assumption in the conventional method of obtaining a position fix described of it addressing essentially a four dimensional problem, i.e. solving for x, y, z and clock offset, and also that each unknown is of equal importance. However, the inventor has realized that, at least for some applications, this assumption is not true. Rather, the clock offset is generally stable and can be predicted from previous values. Therefore, it is not necessary to solve for four unknowns each and every time and hence the conventional four dimensional problem, i.e. solving for x, y, z and clock offset, is reduced to a three dimensional problem, i.e. solving for x, y, z, so simplifying the required computation.

In addition, the resultant position fix obtained using a method of the present invention is more stable as the clock offset as source of potential error is removed. Also, a current position fix can be obtained using only three current pseudoranges measurements whereas conventional methods generally rely on the use of old pseudoranges or pseudoranges derived from old position fixes to supplement missing satellite signals.

BRIEF DESCRIPTION OF DRAWING

A method of obtaining a position fix using a GPS receiver in accordance with the present invention will now be described, by way of example only, with reference to the accompanying figures in which.

DETAILED DESCRIPTION

Figure 1:
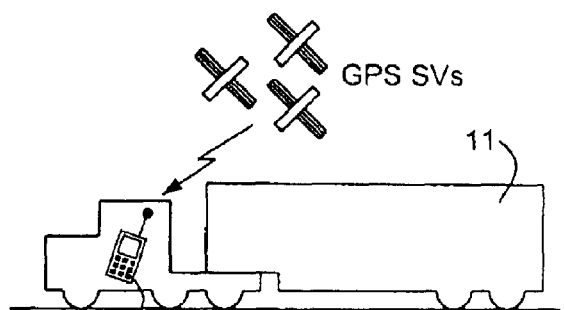
FIG. 1 shows a GPS receiver according to the present invention, located on a vehicle.

FIG. 1 shows a GPS receiver according to the present invention and located on a vehicle for the purpose of providing a position fix. The GPS receiver comprises a GPS antenna, GPS receiver front-end (not shown) and GPS processing unit (not shown) and utilizes conventional methods for GPS signal acquisition and tracking. By way of example, such methods of signal acquisition and tracking are described in GPS Principles and Applications (Editor, Kaplan) ISBN 0-89006-793-7 Artech House. Also, the design and manufacture of such GPS receivers is entirely conventional and, accordingly, those parts which do not directly relate to the present invention will not be elaborated upon here further.

When operative, GPS signals are acquired and tracked for the purpose of deriving pseudorange information from which a position fix is obtained using the following method in accordance with the present invention:

Step 1. Estimates of the position of the GPS receiver (x, y, z) and the user clock offset t are made based on that determined during earlier, conventional computation in which 4 unknowns, i.e. x, y, z and clock error, were resolved. Ideally, the estimate of the position is best provided from the last position fix, however, it is desirable to estimate the clock offset based on many more previous measurements. For example, one might establish the mean clock drift rate t, i.e. the rate at which the local clock is diverging from GPS time, from the previous 50 measurements. Then, an estimate of the clock offset may be provided as a function of the previous clock offset, the clock draft rate and the elapsed time since the last position fix.

Step 2. From new pseudorange measurements, the real range $R_i$ from the GPS receiver to respective GPS satellites is determined:

$$R_i = \rho_i - ct$$

Step 3. The following direction cosines matrix H is calculated:

$$H = \begin{pmatrix} \frac{x-s_x^1}{r_1} & \frac{y-s_y^1}{r_1} & \frac{z-s_z^1}{r_1} \\ \frac{x-s_x^2}{r_2} & \frac{y-s_y^2}{r_2} & \frac{z-s_z^2}{r_2} \\ \vdots & \vdots & \vdots \\ \frac{x-s_x^n}{r_n} & \frac{y-s_y^n}{r_n} & \frac{z-s_z^n}{r_n} \end{pmatrix}$$

where n is the number of satellites (3 or more) and $r_i$ is the distance from an estimate of the position of the GPS receiver to the $i^{th}$ satellite, calculated in the following manner:

$$r_i = \sqrt{(x-s_x^i)^2 + (y-s_y^i)^2 + (z-s_z^i)^2}$$

Step 4. The following pseudorange error vector Q is calculated:

$$Q = \begin{pmatrix} R_1 - r_1 \\ R_2 - r_2 \\ \vdots \\ R_n - r_n \end{pmatrix}$$

Step 5. The following a correction vector, P is calculated whereby. $P=(H^TH)^{-1}H^TQ$ (or if n=3, $P=H^{-1}Q$). With more than 3 satellites in view, preferably for obtaining an accurate position fix, the above method uses a 3×3 matrix inversion rather than a more computationally expensive, 4×4 matrix inversion, as used by convention methods of the type described above.

Step 6. An estimate of the position of the GPS receiver is corrected: X'=X+P
where:

$$X = \begin{pmatrix} x \\ y \\ z \end{pmatrix}$$

and X' is the corrected version. These steps are repeated until the solution has converged to a required degree of accuracy.

Step 7. Once the position fix has been calculated, the estimate of the clock error is updated. This can be done, for example, by determining the mean residual timing error $\delta t_j$ from the differences of the actual distance from the position fix X (x, y, z) to each satellite ($s_x^i$, $s_y^i$, $s_z^i$) and the measured range $R_i$ to them, thus:

$$\delta t_j = \frac{1}{n} \sum_{i=1}^{n} \frac{1}{c} \sqrt{(x-s_x^i)^2 + (y-s_y^i)^2 + (z-s_z^i)^2} - R_i$$

The updated estimate of clock error can then be determined from the previous t'$_j$ (i.e. old t) and the means residual timing error $\delta t_j$:

$$t = t' - \delta t_j$$

Figure 2:
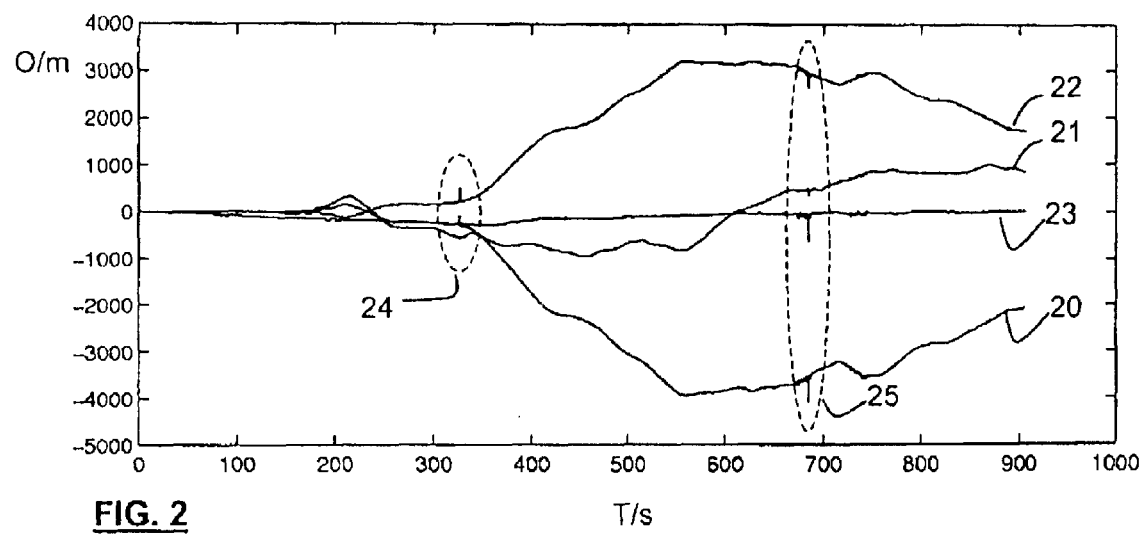
FIG. 2 is a graph showing a plot of the x, y and z co-ordinates and the clock offset of a GPS receiver in a vehicle during a 900 second test drive, wherein the position fix was determined using a conventional method.
Figure 3:
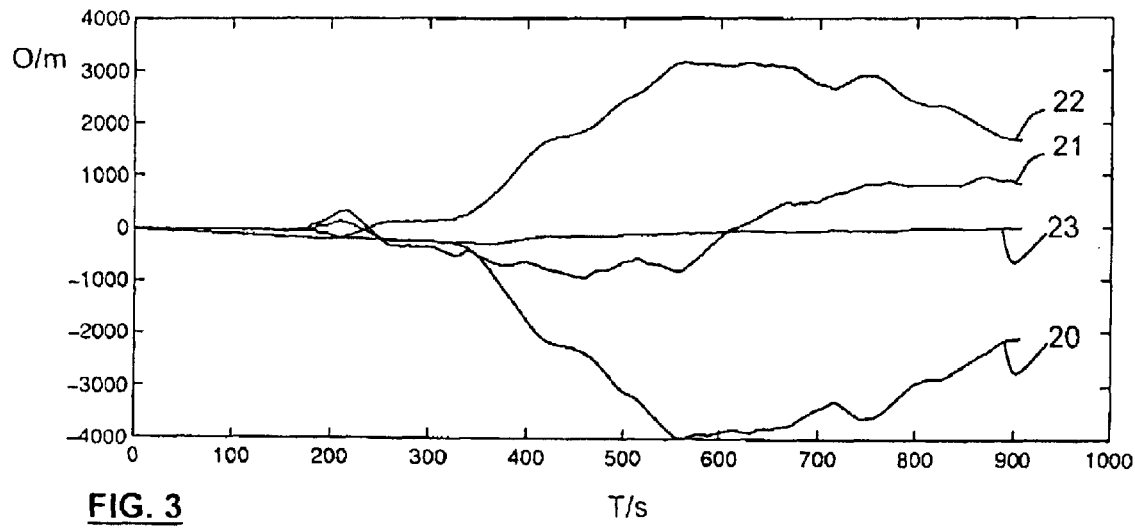
FIG. 3 is a graph showing a plot of the x, y and z co-ordinates and the clock offset of a GPS receiver in a vehicle during the same 900 second test drive, wherein the position fix was determined using a method according to the present invention.

Steps (2) to (7) are repeated every half second in order to track the movement of the GPS receiver and thereby the vehicle In order to illustrate the benefits of the present invention, pseudorange test data was obtained from a GPS receiver located in a vehicle during a 900 second (15 minute) vehicle test drive during which pseudoranges were measured to each available satellite, approximately every half second. Based on the pseudorange test data and obtained using both a conventional method of obtaining a position fix and the aforementioned method according to the present invention respectively, FIGS. 2 and 3 show plots 20 to 23 describing the x, y and z co-ordinates, and the clock offset (multiplied by the speed of light c for the purpose of expressing as a distance measurement) during the test drive. The test involved the vehicle being stationary for roughly 180 seconds (hence the substantial flat section in all plots between 0 and 180 seconds) followed by travel along largely open roads.

As the pseudorange measurements were taken approximately every half second, each corresponding position fix can be considered to be one of a sequence which will bear a strong relationship to the previous one. The dynamics of a typical vehicle mean that the x, y and z co-ordinates will change, however, the change in the clock offset is completely independent of the vehicle dynamics. Rather, it is generally a function of the accuracy of a local, crystal oscillator of the GPS receiver and although the crystal oscillator error can be large, in most practical circumstances, it only varies with temperature. Therefore, over the period of a few minutes, one can expect the clock offset to be highly stable and this is indeed reflected in the plots 23 of both FIGS. 2 and 3.

Referring to FIG. 2 which shows the plots obtained using a conventional method of obtaining a position fix, a first glitch 24 occurs at about 320 seconds as the vehicle travels around a roundabout, under a flyover, and a second glitch 25 at about 550 occurs as the vehicle enters a section of tree-lined roads with progressively worse visibility of the sky and only returned to open skies at around 780 seconds. By utilizing the inherent stability of the clock offset, the method of the present invention mitigates glitches in the plot as illustrated in FIG. 3. As such, the above analysis shows that not only is the method of the present invention more computationally efficient, it is more robust to the effects of reduced strength signals caused by obscuration of the GPS satellites.

To assess the effectiveness of this clock offset prediction in association, pseudoranges measured from the previously mentioned 15 minute test run were processed. In this case the extreme values of $\delta t_j$ were −8 ns and 11 ns which represents range errors of −2.4 m and 3.3 m respectively with a mean of −1.4 ns representing −0.42 m. It is therefore clear that the clock offset was predicted reasonable accurately.

Note that for the purpose of evaluating the present invention with the pseudorange test data, an initial estimate of the clock error drift rate was provided based on from the velocity fix calculation over the first 100 seconds. Subsequently, this was used in the position calculations for the first 100 seconds worth of pseudoranges which of course could not be accomplished in real-time. As stated above, in real-time, the estimate of the clock drift error would conveniently be based on measurements obtained using conventional methods before the reduced computation method of the present invention was employed.

From reading the present disclosure, other modifications will be apparent to persons skilled in the art. Such modifications may involve other features which are already known in the design and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of obtaining a position fix in a GPS receiver comprising the steps of:
   (i) providing an estimate of clock offset between the GPS receiver and the GPS satellites;
   (ii) measuring a set of pseudoranges from the GPS receiver to GPS satellites; and
   (iii) either:
      (a) resolving the set of pseudoranges obtained in step (ii) to obtain a position fix, or
      (b) providing an estimate of the position of the GPS receiver, resolving the set of pseudoranges obtained in step (ii) to obtain a position fix correction, and obtaining a position fix using the estimate of the position of the GPS receiver and the position fix correction wherein resolving the pseudoranges in step (iii)(a) or step (iii)(b) does not involve resolving the pseudoranges for either a new clock offset or clock offset correction.

2. A method according to claim 1 further comprising the step of (iv) using the position fix obtained in step (iii) to update the estimate of the clock offset in step (i), wherein the steps (i) to (iv) are cyclically repeated.

3. A method according to claim 1 or step 2 wherein step (iii) involves calculated the direction cosines matrix H:

$$H = \begin{pmatrix} \frac{x-s_x^1}{r_1} & \frac{y-s_y^1}{r_1} & \frac{z-s_z^1}{r_1} \\ \frac{x-s_x^2}{r_2} & \frac{y-s_y^2}{r_2} & \frac{z-s_z^2}{r_2} \\ \vdots & \vdots & \vdots \\ \frac{x-s_x^n}{r_n} & \frac{y-s_y^n}{r_n} & \frac{z-s_z^n}{r_n} \end{pmatrix}$$

where n is the number of satellites and $r_i$ is the distance from an estimate of the position of the GPS receiver to the $i^{th}$ satellite, calculated in the following manner:

$$r_i = \sqrt{(x-s_x^i)^2 + (y-s_y^i)^2 + (z-s_z^i)^2}.$$

4. A GPS receiver configured to obtain a position fix by a method according to claim 1.

* * * * *